United States Patent [19]

Ohshima et al.

[11] Patent Number: 4,812,911
[45] Date of Patent: Mar. 14, 1989

[54] ADAPTER WITH BUILT-IN SHUTTER

[75] Inventors: Shigeru Ohshima; Takeshi Sekiguchi, both of Kanagawa, Japan

[73] Assignee: Canon Kabushiki Kaisha, Tokyo, Japan

[21] Appl. No.: 5,096

[22] Filed: Jan. 20, 1987

[30] Foreign Application Priority Data

Jan. 28, 1986 [JP] Japan .................... 61-010437

[51] Int. Cl.⁴ .............................................. H04P 5/30
[52] U.S. Cl. ........................... 358/225; 358/213.13
[58] Field of Search ............... 358/213.13, 909, 225, 358/226, 227, 209

[56] References Cited

U.S. PATENT DOCUMENTS

| | | | |
|---|---|---|---|
| 4,301,478 | 11/1981 | Sakane et al. | 358/227 |
| 4,597,015 | 6/1986 | Johnson | 358/225 |
| 4,611,244 | 9/1986 | Hanma | 358/227 |
| 4,646,156 | 2/1987 | Iizuka et al. | 358/225 |
| 4,695,891 | 9/1987 | Peterson | 358/213.13 |

FOREIGN PATENT DOCUMENTS 0023833  2/1981  European Pat. Off. .

OTHER PUBLICATIONS

Abstract of Japanese Patent No. 61-10370 dated 1/17/86, vol. 10, No. 150 (E-408) [2207] May 31, 1986.

*Primary Examiner*—Robert Lev
*Attorney, Agent, or Firm*—Fitzpatrick, Cella, Harper & Scinto

[57] ABSTRACT

An adapter with built-in shutter arranged to be attached between a master lens and a camera body, includes a first lens group having a negative power and disposed at a position on the master lens side of an image forming plane of the master lens, a second lens group having a positive power and arranged to receive a bundle of rays passing the first lens group, and a shutter for controlling an exposure.

16 Claims, 2 Drawing Sheets

ADAPTER WITH BUILT-IN SHUTTER

BACKGROUND OF THE INVENTION

1. Field of the Invention

The present invention relates to a photographing system of a television camera or a video camera in which an image pickup means such as a vidicon type tube, a CCD or the like is used and, particularly, it relates to a photographing system of this kind in which use is made of a shutter which is arranged to provide intermittent exposures.

2. Description of the Related Art

In a photographing system such as a television camera or a video camera, in which an image pickup plane is scanned by a scanning beam, (which will be generally referred to as "television camera"), it has been a usual practice to use means for intermittently exposing the image pickup plane when it is desired to take a picture of an object moving at a high speed faster than the scanning time of one frame. By using such intermittent exposure means, it is possible to apply the exposure to the image pickup plane at a high shutter speed substantially faster than the scanning time per one frame, so that a distinct picture may be obtained, without causing blurring of picture owing to the movement of the object.

In an example of the conventional arrangement of this kind, a shutter of a rotary disc type having a transparent portion therein is used. This shutter is arranged in front of a photographing lens and it is rotated to intermittently pass a bundle of rays coming from the object into the photographing lens at short periods. According to such arrangement, a spatial restriction required to dispose the shutter means is small, but the rotary shutter requires a relatively large diamater in order to allow the bundle of rays having a relatively large diameter to pass into the photographing lens, with the result that the overall size of the device is increased.

In another example of the conventional arrangement of this kind, a rotary shutter is disposed at a position near an image forming plane of a photographing lens to intermittently pass a bundle of rays, and the photographing lens and the shutter are formed as an integral system. According to this arrangement, the shutter means including the rotary shutter and the mechanism for driving said rotary shutter is relatively small in size, but it is very difficult to dispose such shutter means at or near the position of the image pickup plane, in view of a mechanism of the adapter. Furthermore, the adapter of this type is provided with a bulit-in shutter, so that it is relatively large in size, and such an arrangement is unsuitable to a simple photographing operation which does not require the use of the built-in shutter.

With the object of eliminating the above-mentioned disadvantages of the conventional arrangements, we have proposed a detachable adapter which is used at the time of taking a photograph of an object moving at a high speed, as disclosed in our co-pending U.S. patent application, Ser. No. 692,129. According to this proposal, a first optical system constitutes a master lens and an adapter including a second optical system is detachably attached to said first optical system. At the time of ordinary photographing operation, only the first optical system is used, while at the time of taking a photograph of a high-speed moving object an intermediate image of the object is formed by the first optical system and then said intermediate image is transformed by the second optical system included in the adapter into a reformed image on an image pickup means. A rotary shutter is disposed near the position where the intermediate image is formed. According to this arrangement, the image formed on the image pickup plane when the adapter including the second optical system and the rotary shutter is used to take a photograph of a high-speed moving object is in reversed relation to the image formed on the image pickup plane at the time of ordinary photographing in which only the first optical system is used to take a photograph of the high-speed moving object, it is necessary to take a special measure, such as mounting the camera body in reversed position, electrically reversing the scanning direction of the photographing means, etc.

SUMMARY OF THE INVENTION

It is a first object of the present invention to provide a photographing device which can take a photograph of a high-speed moving object, without applying any modification to the conventional camera body and/or lens barrel.

It is another object of the present invention to provide a compact adapter with a built-in shutter which enables photographing of a high-speed moving object.

It is a further object of the present invention to provide an adapter in which the reversal of the image formed on the image pickup means is avoided.

Other objects of the present invention will be understood from the following descriptions which will be made will reference to the accompanying drawings.

DETAILED DESCRIPTION OF THE PREFERRED EMBODIMENT

Figure 1:
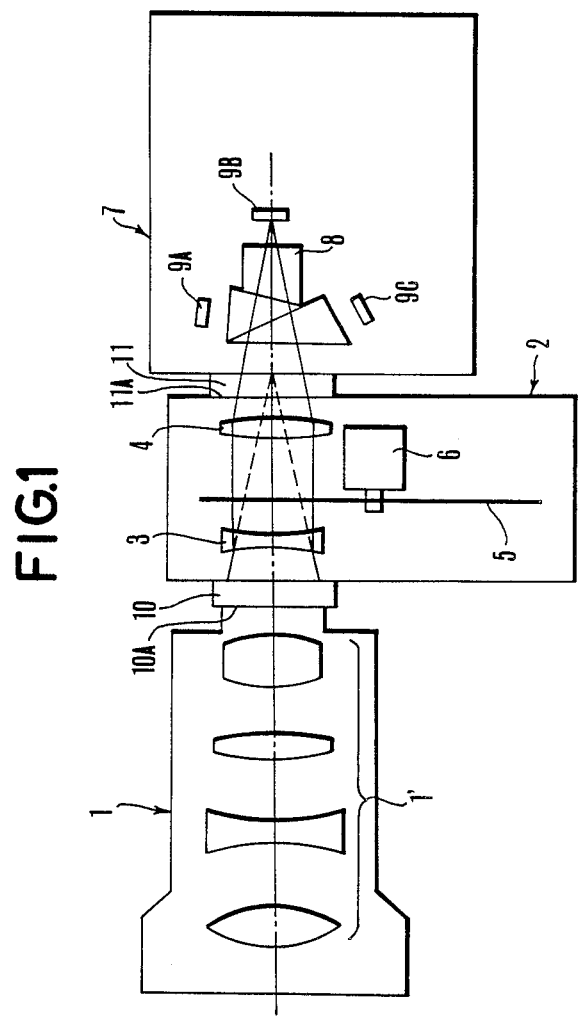
FIG. 1 is a schematic view showing an embodiment of the present invention.
Figure 2:
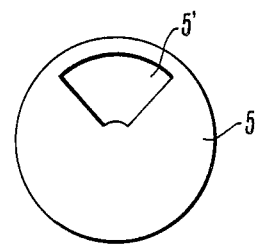
FIG. 2 is a front view showing the rotary shutter shown in FIG. 1.

FIG. 1 illustrates a preferred embodiment of an optical system including an adapter according to the present invention.

A lens barrel 1 includes a photographing lens 1' which forms a master lens. A television camera body 7, which has been publicly known per se, includes a color separating prism 8 and image pickup elements 9A, 9B and 9C which are disposed near the respective ones of the predetermined image forming planes of the photographing lens 1'. These image pickup elements 9A, 9B and 9C are arranged to convert a distribution of strength of an optical image having specific wave lengths produced by the color separating effect of the color separating prism into electrical signals. An adapter with a built-in shutter 2 according to the present invention is detectably attached between the lens barrel 1 and the television camera body 7. The lens barrel 1 is connected to the adapter 2 by means of a mount 10 and said adapter 2 is connected to the television body 7, by means of a mount 11. At the time of the ordinary photograhing operation where the photographing of the high-speed moving object is not effected, the adapter with built-in shutter 2 is not used and the lens barrel 1 including the photographing lens 1' is directly assembled with the television camera body 7. At the time of photographing of the high-speed moving object, the adapter with built-in shutter 2 is mounted between the lens barrel 1 and the television camera body 7, as shown in FIG. 1.

The adapter with built-in shutter 2 includes a divergent lens portion 3 having a negative power and a convergent lens portion 4 having a positive power, and it constitutes an attachment lens relative to the master lens. The shutter means 5 for intermittently controlling an exposure is included in the adapter.

In the embodiment of present invention, the focal length of the photographing lens 1 is substantially equal to the composite focal length of the lens groups 1', 3 and 4 of the optical system which is formed when the adapter 2 is mounted between the master lens and the camera body, so that no change of the magnification of the lens system is produced even when the adapter is attached.

In the embodiment as shown in the drawings, a rotary shutter 5 driven by a motor 6 is used as the shutter means. The rotary shutter 5 consists of a disc having a fan-shaped transparent window 5'. The shutter means is not limited to the rotary shutter as explained above, and a liquid crystal shutter or the like may be used.

Figure 3:
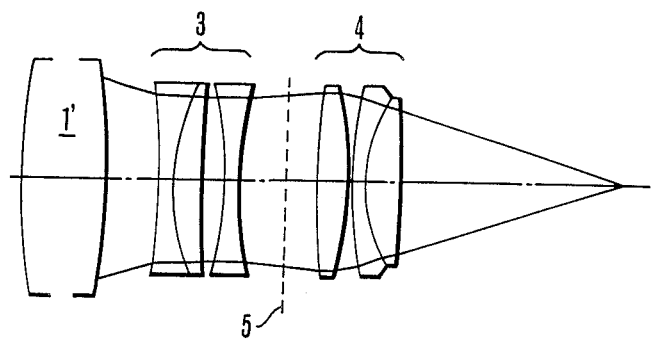
FIG. 3 illustrates an example of the optical system of the adapter with built-in shutter according to the present invention.

FIG. 3 illustrates an example of the optical system of the adapter with built-in shutter 2. As shown in FIG. 3, the optical system is so constructed that the convergent bundle of rays coming from the photographing lens 1' is transformed into a substantially parallel, slightly divergent or slightly convergent pencil of rays under the action of the divergent lens group 3 which is disposed at the position on the photographing lens side of the image forming plane of the photographing lens 1' and then the bundle of rays is converged under the action of the convergent lens group 4, so that the adapter with built-in shutter 2 has a flange-back length which is equal to that of the lens barrel 1. The term "flange-back length" means a distance between a standard mounting plane of the lens barrel and an image focusing point of the lens. Referring to the construction of the optical system of the above-mentioned embodiment, this optical system is so constructed that the distance between the image focusing point (where the plane of the image pickup element 9 is positioned) and the standard mounting plane 10A of the lens barrel 1 which is directly mounted onto the camera body 7 by means of the mount 11, without interposing the adapter 2 shown in FIG. 1, is made to be equal to the distance between the image focusing plane and the standard mounting plane 11A of the adapter 2 which is assembled in integral form with the lens barrel 1 and the camera body 7 by means of the mounts 10 and 11. According to the construction of the optical system as described above, it is possible to form the image on the same plane of the image pickup element 9 in the case where the adapter with built-in shutter is mounted as well as in the case where said adapter is not mounted.

Preferably, the shutter 5 is disposed within a space between the divergent lens group 3 and the convergent lens group 4 in view of economy of space. However the shutter 5 may be disposed in front of the divergent lens group 3 or in back of the convergent lens group 4, if there is enough space to allow such disposition.

In the construction as explained above, it is possible to effect the ordinary photographing operation, by assembling the photographing lens 1' directly with the camera body 7, without using the adapter 2 and it is also possible to effect the special photographing operation, such as the photograhing of the high-speed moving object, by interposing the adapter with built-in shutter 2 between the photographing lens and the camera body, when required. In any case, it is possible to properly form an image on the image pickup element arranged in the camera body 7. If the rear end surface of the lens projects rearwardly from the flange surface toward the image side, an arrangement in which a back-focus length of the photographing lens coincides with that of the adapter 2 is required, in addition to the arrangement in which the flange-back length of the lens is equal to that of the adapter, in order to avoid the collision of the rear end surface of the lens with any element within the camera body. The term "back-focus length" means a distance between an apex of the rear end surface of the lens and the image focusing point.

It will be understood that the present invention provides an adapter with built-in shutter which can be interposed between a photographing lens and a camera body only when it is necessary to use the adapter in order to take a photograph of a high-speed moving object or the like and which enables to properly form an image onto a plane of an image pickup means in case where the adapter is mounted as well as in case where the adapter is not mounted. Furthermore, the present invention provides an adapter which avoids the disadvantages of the conventional devices as hereinbefore described, namely the increase of overall size of the device in which the shutter is arranged in front of the photographing lens, the difficulty in the mechanism of arranging the shutter near the image pickup plane, and the problem or reversal of image as explained in the co-pending U.S. patent application Ser. No. 692,129.

What is claimed is:

1. An adapter arranged to be attached between a camera body, which includes image converting means disposed at a position of an image forming plane to convert an image of an object into image information, and a first image forming lens system, for forming an image on the image forming plane, said adapter comprising:
    (a) optical means, at least a part of which is disposed at a position on the first image forming lens system side of a predetermined image forming plane of the first image forming lens system, said optical means being arranged to relay a photographing bundle of rays, without forming an image therein, and then to form an image on the image converting means; and
    (b) shutter means for applying intermittent exposures to the image converting means,
    wherein said adapter and the first image forming system comprising a second image forming system.

2. An adapter according to claim 1, wherein a focal length of the first image forming lens system is substantially equal to a composite focal length of the first image forming lens system and said optical means.

3. An adapter according to claim 1, wherein said optical means includes a first lens component having a negative power and a second lens component having a positive power, disposed successively from the side of the first image forming lens system.

4. An adapter according to claim 3, wherein said shutter means is disposed between said first lens component and said second lens component.

5. An adapter according to claim 4, wherein said shutter means consists of a rotary shutter.

6. An adapter according to claim 1, wherein said optical means of said adapter has a back-focal length which is substantially equal to that of the first image forming lens system.

7. An adapter according to claim 3, wherein said first lens component produces a parallel or substantially parallel bundle of rays.

8. An adapter arranged to be attached between a lens barrel having a first image forming lens system with a predetermied flange-back length and a camera body having converting means for converting a photographing bundle of rays into image formation, said adapter comprising:
  (a) a first lens component having a negative power, said first lens component being disposed at a position on the first image forming lens system side of a predetermined image forming plane of the first image forming lens system and arranged to relay the photographing bundle of rays;
  (b) a second lens component having a positive power, said second lens component being arranged to relay said bundle of rays produced by said first lens component and to form an image on the converting means from the bundle of rays; and
  (c) shutter means arranged to apply intermittent exposures to the converting means, in which a flange-back length of said adapter is equal to the predetermined flange-back length of the lens barrel.

9. An adapter according to claim 8, wherein a focal length of the first image forming lens system is substantially equal to a composite focal length of the first image forming lens system with said first and second lens components.

10. An adapter according to claim 8, wherein said shutter means is disposed between said first and second lens components.

11. An adapter according to claim 8, wherein said shutter means consists of a rotary shutter.

12. An adapter according to claim 8, wherein said adapter has a back-focal length which is substantially equal to that of the first image forming lens system.

13. A photographing system comprising, successively from its object side to its image plane side;
  (a) a first image forming lens system having a positive power;
  (b) adapter means mountable on said first image forming lens system, said adapter means including,
    (1) a first lens component having a positive power,
    (2) a second lens component having a negative power, and
    (3) a shutter arranged to apply intermittent exposures; and
  (c) image pickup means arranged to convert an image forming bundle of rays produced by said first image forming lens system and said adapter means into image information.

14. A photographing system according to claim 13, wherein a focal length of said first image forming lens system is equal to a composite focal length of said first image forming lens system with said first and second lens components.

15. A photographing system according to claim 13, wherein said shutter is disposed between said first and second lens components.

16. A photographing system according to claim 15, wherein said shutter consists of a rotary shutter.

* * * * *

UNITED STATES PATENT AND TRADEMARK OFFICE
CERTIFICATE OF CORRECTION

PATENT NO. : 4,812,911

DATED : March 14, 1989

INVENTOR(S) : Shigeru Ohshima, et al.

It is certified that error appears in the above-identified patent and that said Letters Patent is hereby corrected as shown below:

COLUMN 1:

Line 36, "diamater" should read --diameter--.

COLUMN 2:

Line 10, "optical system" should read --optical means is used.  Accordingly, when the second optical system--.

Line 31, "will" should read --with--.

Line 60, "detectably" should read --detachably--.

Line 65, "grahing" should read --graphing--.

COLUMN 4:

Line 2, "photograhing" should read --photographing--.

Line 53, "comprising" should read --comprise--.

UNITED STATES PATENT AND TRADEMARK OFFICE
CERTIFICATE OF CORRECTION

PATENT NO. : 4,812,911

DATED : March 14, 1989

INVENTOR(S) : Shigeru Ohshima, et al.

It is certified that error appears in the above-identified patent and that said Letters Patent is hereby corrected as shown below:

COLUMN 5:

Line 12, "image formation" should read --image information--.

COLUMN 6:

Line 10, "side;" should read --side:--.

Signed and Sealed this

Twenty-sixth Day of December, 1989

Attest:

JEFFREY M. SAMUELS

*Attesting Officer*     *Acting Commissioner of Patents and Trademarks*